April 12, 1938.　　　O. I. JUDELSHON　　　2,113,791
CLUTCH
Filed Sept. 25, 1936　　　2 Sheets-Sheet 2
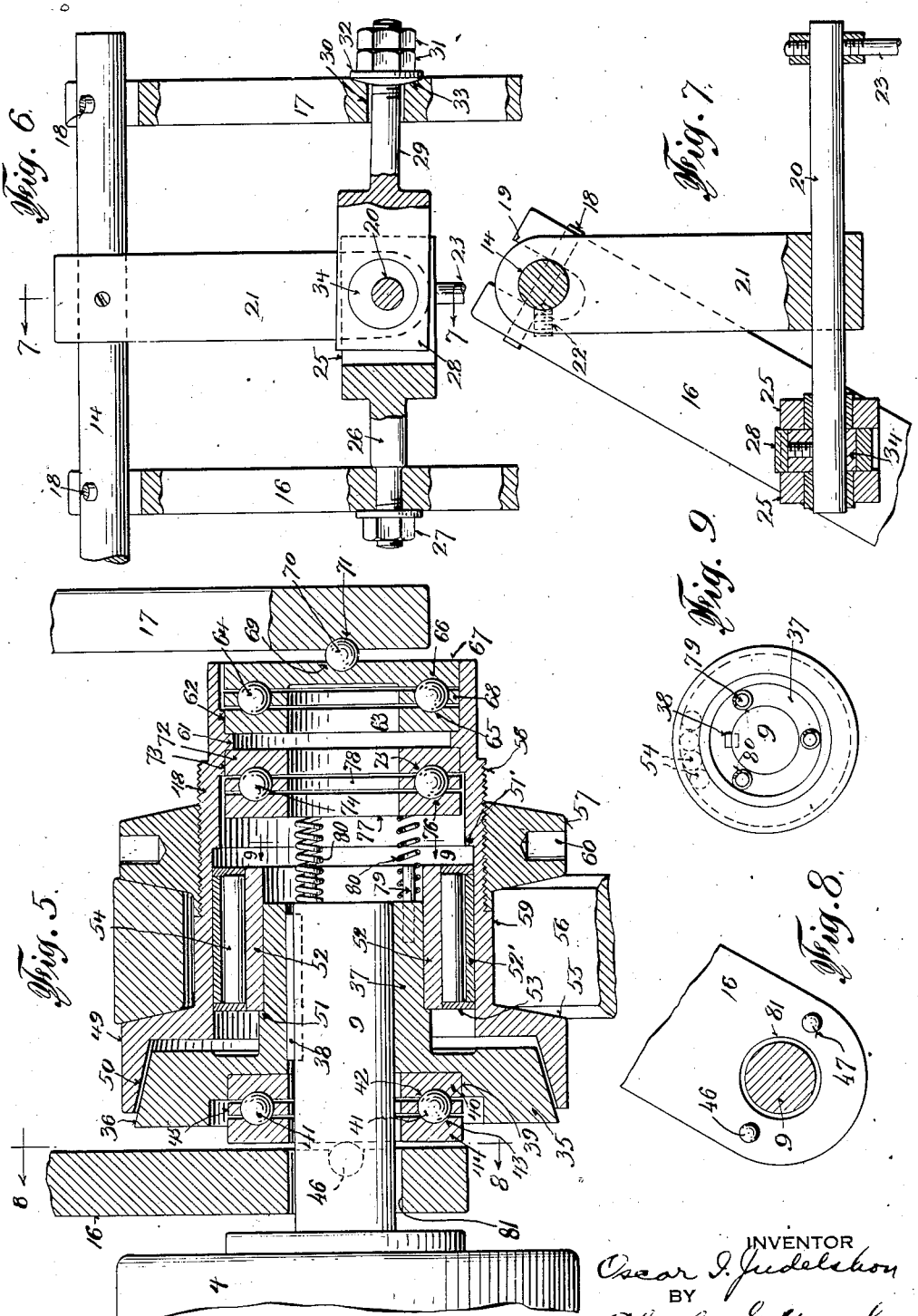
INVENTOR
Oscar I. Judelshon
BY
Charles G. Hensley
ATTORNEY Patented Apr. 12, 1938

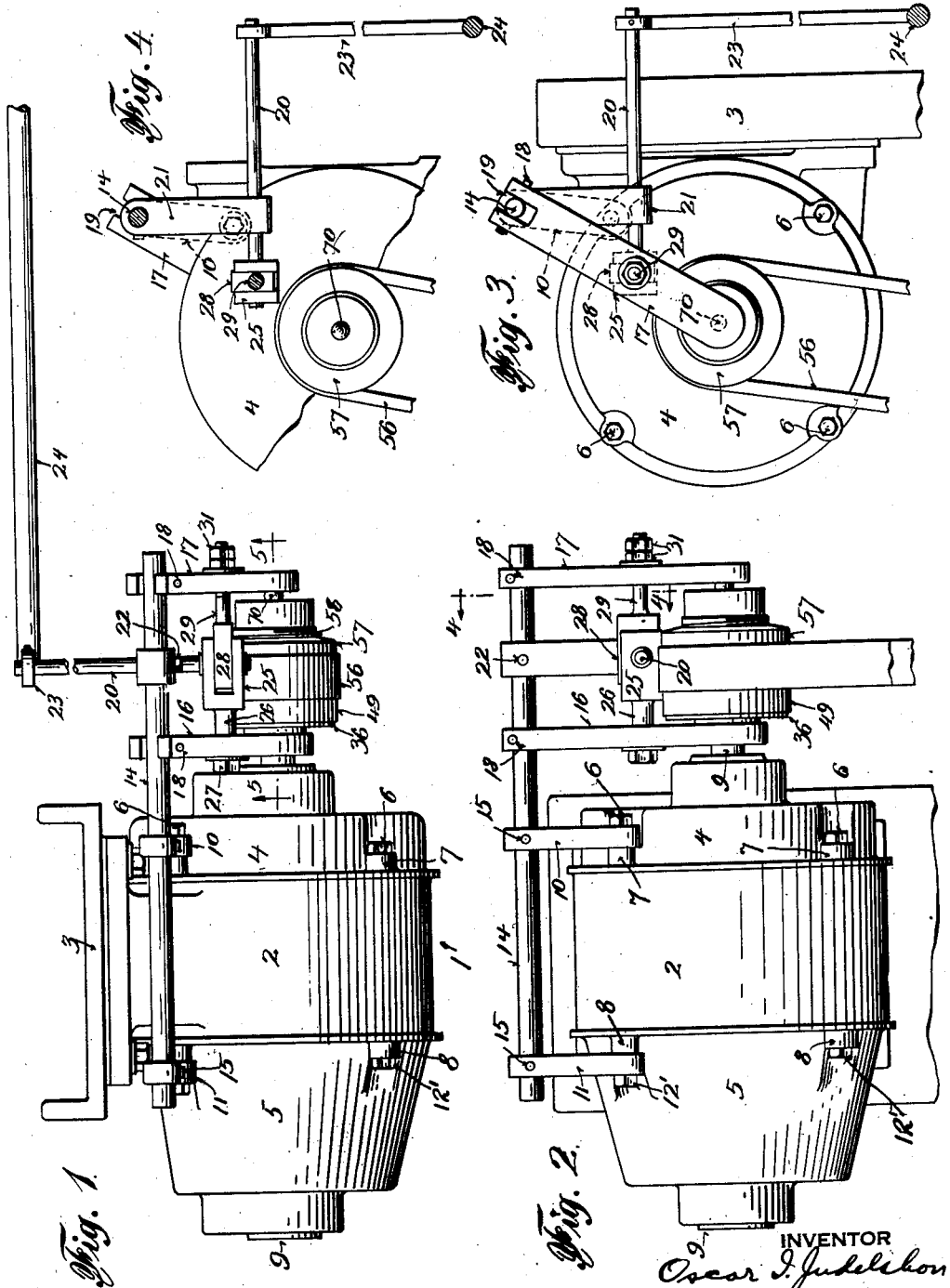

2,113,791

UNITED STATES PATENT OFFICE 2,113,791

CLUTCH

Oscar I. Judelshon, Park Ridge, N. J.

Application September 25, 1936, Serial No. 102,471

18 Claims. (Cl. 192—68)

My invention relates to clutches for causing the stopping and starting of a driven device in relation to a source of power. One object is to produce a clutch of very simple, inexpensive and compact form, and one which may be engaged and disengaged by the exertion of the smallest possible energy.

Another object is to provide a clutch which will allow the source of power to operate with negligible resistance when the driven device is out of operation.

Another object is to provide a clutch which is noiseless in its operation.

Another object is to provide a clutch which is very sensitive to the controlling member and one which will for any given size be effective for relatively heavy duty.

Notwithstanding all of the clutches which have been designed for throwing mechanical devices into and out of operation from a source of power, I am unable to find any clutch on the market which can be used direct with a fast moving electric motor. The present clutch may be placed on the shaft of a motor running at comparatively ordinary, or even high motor speed for coupling and uncoupling the driven device.

As far as I am able to ascertain, there are no clutches on the market which can be applied to a shaft running over 600 revolutions per minute, whereas, the present clutch may be applied to a shaft running at 1750 revolutions per minute or more.

Another object of my invention is to provide a clutch which is very compact and which may be applied to the end of a motor shaft without having the shaft made specially long and without having to extend the shaft. In other words, the compactness of the clutch and the character of the mounting permit the clutch to be applied to the comparatively short end projecting in standard types of motors. The device is therefore adapted for application to the great number of motors now in use.

Another object of my invention is to provide a mounting for applying the clutch to various types of electric motors, so that dealers need stock with only different sizes of clutches to correspond with the various shaft diameters and the mounting will permit the clutches to be applied to various types of motors.

Another object is to employ in a clutch, various thrust bearings for the different parts, as well as a roller bearing between the clutch members, so that the operation of the clutch will be smooth and noiseless and without vibration. The present clutch is not only applicable to motors, but it is adapted for almost universal application; that is to say, it may be used on any type of machinery or apparatus where a clutch is needed.

Other objects and advantages will be set forth in the following detailed description of my invention.

In the drawings forming part of this application,

Figure 1 is a plan view of a motor to which my improved clutch is applied,

Figure 2 is a front elevation thereof,

Figure 3 is an end elevation looking at the right hand end of Figure 2,

Figure 4 is a sectional view taken on the line 4—4 of Figure 2,

Figure 5 is a sectional view, on an enlarged scale, taken on the line 5—5 of Figure 1, Figure 6 is a plan view, with parts broken away, and showing the eccentric for operating the clutch, Figure 7 is a sectional view taken on the line 7—7 of Figure 6, Figure 8 is a sectional view taken on the line 8—8 of Figure 5, and Figure 9 is a sectional view taken on the line 9—9 of Figure 5.

I will describe my invention applied to a motor shaft but it is understood it is subject to universal application. It will be understood that the motor may be mounted on an overhead support, a wall support, or a base support, according to its desired location in relation to the machine to be driven, and the present invention is adapted to be applied to a motor regardless of its mounting position. In the drawings I have shown a motor 1 having a motor frame 2 which is mounted on a channel beam 3 in customary manner, and while the mounting is shown as a wall mounting it will be understood that it may be mounted in any position.

I have shown the armature enclosed by caps 4, 5 attached to the motor frame by means of bolts 6, 12' which pass through the bosses 7, 8 of the caps and are threaded into the motor frame, to rigidly support the caps at opposite ends of the motor frame. These features are of ordinary construction and it will be understood that the motor has a shaft 9 which extends beyond the cap 4 but this extension is not sufficiently long in most cases to accommodate a clutch although it is long enough to accommodate the present clutch because of its compact construction.

The means for mounting the clutch device upon the motor is as follows: There are two bracket arms 10 and 11 one of which is attached against the boss 7 of the cap 4 by means of the bolt 6 which ordinarily merely attaches the cap to the motor frame; but in some instances it may be necessary to supply a longer bolt of the same nature to accommodate the bracket 10 at the end of the boss 7. The bracket arm 10 has an aperture to receive this bolt. The other bracket arm 11 has an aperture to receive the bolt 12' which may be one of the bolts supplied with the motor or in some cases it may be necessary to supply a longer bolt to accommodate the bracket. The bolt 12' passes through the boss 8 of the cap 5 and enters the motor frame 2.

As these bracket arms may be applied to any of the bosses 7 or 8 and as there are usually four such bosses on the caps of the motor frame, it will be obvious that these brackets may be applied to the motor frame in any one of four positions around the axis of the motor, according to whether the motor is mounted on an overhead support, a lower support, or a base support. These bracket arms require no change in the construction of the motor frame so that they are adapted to be applied to various types of motors.

There is a shaft 14 which is mounted in the free ends of the bracket arms 10, 11 where they are secured by the set screws 15 and it is obvious that the bracket arms may be spaced different distances apart on the shaft, according to the length of the motor frame, so that the parts may be mounted on various types of motors. In other words, it is not necessary to alter the construction of the motor to make my invention applicable thereto.

The shaft 14 extends on the right beyond the end of the cap 4 in Figures 1 and 2 and on this extended portion there are attached two supporting arms 16, 17 which are connected to the shaft by pins 18 which pass through the shaft 14 and which permit the arms 16, 17 to swing slightly at right angles to the axis of the shaft. The shaft seats in the open sockets 19 on the ends of these arms so that the crotch thus formed guides the arms on the shaft. These arms are adapted to be drawn toward each other for tightening the clutch to throw the machine into operation by the motor and to be moved apart to release the clutch and thereby throw the machine out of operation. This is effected by an eccentric device as follows:

There is a short shaft 20 adapted to rock in an aperture in the end of the bracket 21 which is supported upon the shaft 14 and which is held thereon by a set screw 22. The shaft 20 is rocked through a crank lever 23 which itself may be operated by a longitudinal rod 24 which may run the whole length of the machine which is to be controlled by the clutch, so that the operator may throw the clutch into and out of operation from any point along the machine which is being operated by the motor.

The shaft 20 projects through a fork 25 arranged on one end of the rod 26 which is reduced in diameter and extends through the rocking arm 16 where it is clamped by the nut 27. The shaft also extends through the plate 28 which is carried by a rod 29, and this rod extends through an aperture 30 in the arm 17, the aperture being slightly larger than the rod to permit the latter to swivel in relation to the arm 17. The nuts 31 which are threaded onto the rod 29 press against the dished washer 32 which engages in a spherical recess 33 in the arm 17 to permit the arm 17 to swivel in relation to the rod 29. On the shaft 20 there is mounted an eccentric 34 which engages in an eccentric aperture in the plate 28.

When the shaft 20 is rocked manually by the operation of the rod 24 or the lever arm 23 in one direction of movement, the eccentric 34 causes the arm 17 to be swung so that the lower ends of the arms 16, 17 approach each other slightly and in the opposite direction of movement these two arms are caused to move apart slightly for a purpose which will be stated hereinafter.

The clutch device itself is constructed as follows: At 9 I have shown in Figure 5 the end of the motor shaft which projects from the cap 4 and while this projecting or overhanging end of the average motor shaft is not very long and would not be long enough for a mounting of any clutch heretofore known, it is sufficient for the present device. The male member of the clutch is shown at 35 and while the clutch surface 36 of this member could be flat or any other shape, I prefer to make it frusto conical, as shown.

This clutch member is shown as having an elongated hub portion 37 which fits over the end of the motor shaft 9 and the clutch member is caused to revolve with the shaft by a key 38 which fits into a key way running lengthwise of the shaft. This clutch member, which may be called the male member, therefore revolves whenever the motor shaft revolves. This clutch member is shown as being provided with a recess or pocket 39 facing the left hand end in Figure 5, which recess receives therein one of the cups 40 of a ball bearing.

The balls 41 of this ball bearing travel partly in the raceway or groove 42 of the cup 40 and also partly in an annular groove 43 in the opposite cup 44 of the bearing, the cage 45 serving, as in well known practice, to space the bearing balls apart. This is an ordinary type of ball bearing and in the present case it is used as a thrust bearing for the clutch member 35 so that the pressure to move the clutch member in the direction of the axis of the shaft 9 can be applied without causing resistance or friction to the revolving movement of the clutch member.

I have shown two bearing balls 46 mounted in the recesses 47 in the arm 16 with a portion of each ball projecting from the pocket so as to bear against the outer face of the thrust-bearing cup 44. These balls are arranged on a substantially horizontal line which is at right angles to the length of the arm 16. The purpose of these balls is to permit the arm 16 to apply pressure against the clutch member 35 to force the clutch into engagement. As the arm 16 swings on a pivot from the pin 18 it is not always parallel to the thrust bearing but these balls 46 act as a pivot so that the arm 16 may apply the pressure to the thrust bearing without tilting the latter.

The balls 46 are therefore not used so much for preventing friction between the arm 16 and the thrust bearing, due to the revolving motion of the male clutch member because the friction is prevented by the thrust bearing, but the balls 46 are used more to permit the arm 16 to swing slightly and to apply the pressure to the thrust bearing in such manner as not to cause the latter to rock.

I prefer to form the driven member which may be a pulley or a sprocket, and the female clutch member, in one unitary body with the pulley or sprocket over a portion of the motor shaft. I have shown, for instance, a cylindrical body 48 which is considerably larger in diameter than the motor shaft, and at its left hand end in Figure 5 this body has a projecting portion 49 which on its inner surface is provided with a friction surface 50 which is preferably frusto conical and which is parallel with the frusto conical friction surface 36 of the male member; although it will be understood that if the male member is made with a flat friction surface, then the friction surface 50 may be made to correspond. While flat friction surfaces may be used, they will suffice only for low power transmission and it is preferable in all cases to use frusto conical clutch members to insure a more positive grip between the clutch members.

The cylindrical portion or hub 37 of the male clutch member is shown as being turned down slightly on its right-hand end, to provide a shoulder 51 and I have provided a roller bearing the inner sleeve 52 of which fits on the reduced portion of the hub 37 and at one end abuts against the shoulder 51. There is a shoulder 51' formed in the cylindrical body 48 to prevent the roller bearing from shifting lengthwise in one direction. This roller bearing has the ordinary cage 53 enclosing a ring of rollers 54 which form bearing members between the outer portion of the male clutch member and the inner portion of the female clutch member. The sleeve 52' of the roller bearing fits snugly in the bore of the member 48.

These rollers engage on one side against the outer surface of the sleeve 52 in the male clutch member and at the outside against the sleeve 52' fitting the inner surface of the cylindrical portion 48 of the female clutch member, so that the female member may revolve around the hub of the male clutch member substantially without friction when the clutch is thrown out of operation, and on the other hand, the shaft of the motor may revolve freely in relation to the female clutch member and the pulley when the clutch is thrown out and without material friction. In other words, the motor, when idling, may revolve freely as far as the apparatus to which the power to be applied is concerned, and without dragging the pulley around.

It will be obvious that the motor may drive the machine or apparatus which is to be operated by it either by a belt and pulleys or a chain and sprockets, and while I have shown a belt and pulley in the drawings, it will be obvious that a sprocket may be substituted for the pulley and a chain may be substituted for the belt.

In the drawings I have shown the outside or female clutch member turned down to provide a belt groove 59 and preferably this groove is made with slanting sides 55 to accommodate a belt 56 of the V type, although it will be understood that the outer face of the female clutch member may be made flush to receive a belt of the flat type. Where a V type belt is used one of the flange members 57 may be made separate from the female clutch member and it may be applied over the end of the latter and be provided with an internal thread to co-operate with an external thread 58 on the cylindrical portion of the female clutch member so that this flange member may be screwed along the latter to adjust the width of the belt groove 59 so that the latter may accommodate belts of different width. The flange member 57 is shown as provided with apertures 60 to receive a wrench for screwing this member into position.

Near the right hand end of the cylindrical body 48 in Figure 5 there is provided an internal shoulder or flange 61 and there is seated in the socket 62 one cup 63 of a ball bearing, this cup seating against one side of the flange 61. The balls 64 revolve partly in the groove 65 in the cup 63 and partly in the annular groove 66 in the opposite cup 67 and the usual cage or ball spacer 68 serves to space the balls. This is an ordinary ball bearing and in the present case it is used as a thrust bearing as will appear. The outer cup 67 of this ball bearing is provided with a central, spherical recess 69 in which engages a single ball 70 and this ball also engages in a spherical recess 71 formed in the arm 17.

It will be apparent that any pressure applied against this thrust bearing by the arm 17 will not tend to tilt the thrust ball bearing even though the arm 17 has a swinging motion, because the pressure is applied through the ball 70. The thrust bearing 63—67 permits the arm 17 to apply pressure from right to left in Figure 5 against the female clutch member without any appreciable resistance to the revolving motion thereof.

There is another end thrust ball bearing consisting of the ordinary ball cup 72 which seats in the socket 73 and presses from left to right against the opposite side of the flange 61 to that engaged by the cup 63. The balls 74 travel partly in the groove 75 of this cup and partly in the annular groove 76 in the opposing cup 77 and the bearing has the usual spacer ring or cage 78 for spacing the balls from each other. I have shown three pins 79 (although the number may be increased or decreased), each having one end anchored in the end of the male clutch member 37, and there is a spring 80 surrounding each of these pins and held in place by the pins. Each of these springs presses at one end against the end of the hub 37 and at the other end presses against the cup 77 of the thrust bearing 72—77.

These springs tend at all times to move the female clutch member to the right to the position shown in Figure 5, but their action may be overcome by the pressure supplied by the arm 17 as will appear hereinafter. The end thrust bearing 72—77 serves to avoid any appreciable friction as between the female clutch member and the motor shaft when the clutch is out of operation.

*Operation*

To mount the clutch on a motor two of the bolts 6 are removed and then the apertured ends of the bracket arms 10, 11 are placed against the bosses 7, 8 from which the bolts have been removed; and they are adjusted so that their apertures register with the apertures in the bosses. The bolts 6 are then inserted through the apertures in the arms 10, 11 and are passed through the bosses and into the frame 2 and are tightened up to a limited extent only. If the shaft 14 is not inserted through the arms 10, 11 before the latter are mounted on the bosses 7, 8 it may be inserted through these arms afterwards. The bolts 15 will be left loose or nearly so, to permit the shaft 14 to turn in the bracket arms 10, 11. The arm 16 has an aperture 81 slightly larger than the motor shaft, so that it can be passed over the end of the shaft to lie near to but out of contact with the cap 4 of the motor, and so that the arm 16 may swing slightly in relation to the shaft 9.

The male clutch member and the end thrust bearing 40—44 may now be assembled and then passed over the end of the motor shaft so that the outer cup 44 of the thrust bearing presses against the two balls 46 of the arm 16. The springs 80 may then be assembled on the pins 79 and if the roller bearing has not been assembled in the hub 48 it may now be placed there. The end thrust bearing members 72—77 are inserted into the cylindrical portion of the female clutch member from left to right in Figure 5 so that the cup 72 rests against the inner flange 61. The female clutch member may now be assembled over the roller bearing and over the hub 37 and over the end of the motor shaft.

The thrust bearing 63—67 may now be assembled into the right hand end of the cylindrical body 48 to seat against the outer side of the flange 61 and the ball 70 may be brought into the socket 69 by swinging the arm 17 from right to left in Figure 5. The nuts 27, 31 on the rods 26, 29 may now be adjusted to apply pressure through the arms 16, 17 to the opposite thrust bearings 63—67 and 40—44 until there is a slight space between the friction surfaces 36, 50 of the male and female clutch members. The set screws 15 may now be tightened to prevent rocking of the shaft 14 and to fix its actual position; and the bolts 6 which secure the arms 10, 11 to the motor frame may be tightened hard so that the entire clutch device may then be mounted firmly and rigidly upon the motor frame to prevent vibration of any of the parts during operation.

It will be apparent that the two arms 10, 11 may be spaced different distances apart along the shaft 14 to adapt it for motor frames of different lengths. Furthermore, the radial distance from the axis of the motor shaft through the arc on which the bolts 6 coincide may be different in different motors, but the present mounting is adapted to be accommodated for different motors because the bracket arms 10, 11 are adapted to swing about the bolts 6, thereby accommodating themselves to the position of the shaft 14.

In other words, looking at the device as shown in Figure 3, the shorter the radial distance between the axis of the motor shaft and the bolts 6 the nearer the bracket arms 10, 11 will lie perpendicular to the arms 16, 17 and if the bolts 6 are of greater radial distance from the axis of the motor shaft, then the arms 10, 11 will be swung to an angle, or a more obtuse angle to the arms 16, 17 and in this manner the support is adjustable so that it may be applied to motors having different diameter frames. Each clutch is made for a given diameter of motor shaft.

The device is now set up for operation and the clutch members are normally held out of engagement by the springs 80 which force the female clutch member to the right in Figure 5 and apply pressure to the left in Figure 5 against the male clutch member. If the motor is set into operation the motor shaft will revolve and it will carry the male clutch member around with it by reason of the key 38 but there will be no appreciable load on the shaft or friction because of the several ball bearing thrust members and because of the roller bearing between the clutch members. The motor may idle and the clutch will cause no noise whatsoever.

Whenever the machine or apparatus which is to be driven by the motor is to be set into operation, the operator will move the rod 24 or the lever arm 23 whichever is convenient, and this will rock the shaft 20. The rocking of the eccentric 34 which is on this shaft, will cause the free ends of the rocking arms 16, 17 to move toward each other a slight extent, due to the eccentric motion and this movement, which need be only a fraction of an inch will throw the clutch into action and cause the motor to drive the machine or apparatus through the belt 56. The action in the clutch due to the swinging of the arms 16, 17 will be as follows:

The arm 16 at the left in Figure 5, will generally remain stationary and through the two balls 46 will apply end pressure against the cup 44 of the thrust bearing 40—44 and this will apply pressure from left to right against the male clutch member against the opposition of the springs 80. At the other end of the clutch the following action takes place: The arm 17 swings from right to left and through the ball 70 applies pressure from right to left against the cup 67 and through this end thrust bearing pressure is applied against the flange 61 of the cylindrical member 48 tending to force the female clutch member from right to left against the opposition of the springs 80.

The female clutch member only has to move a fraction of an inch to bring the friction surfaces 50 and 36 into contact whereupon the clutch will be thrown in and the female clutch member, which includes or carries the pulley, will revolve with the male clutch member and with the motor shaft, thereby operating the belt 56 to drive the machine or apparatus to which the power is to be applied. Preferably, the parts are so designed that when the shaft 20 is rocked the eccentric 34 will be at dead center when the clutch members have been fully engaged, so that the clutch will remain in operation until the rod 24 or the lever arm 23 is moved in the opposite direction to that first described.

The present clutch is positive and reliable in its action because in the preferred form it employs frusto conical male and female clutch members and the usual pivoted arms are eliminated. As the frusto conical clutch portions are turned on a lathe they are accurate and perfectly parallel and are in frictional contact throughout when the clutch is in operation. Furthermore, the opposing pressures applied to the clutch members to throw them into engagement are applied through ball thrust bearings so that there is practically no friction as between the members applying the pressure and the clutch members.

The opposing pressures are so applied that the thrust bearings are not tilted or rocked and the fact that the arm 17 rocks in applying the pressures does not cause any rocking of the end thrust bearings. As the springs 80 which cause the opening of the clutch press on one end against the end thrust bearing 72—77 their action causes no resistance to the revolving movement of the parts.

The roller bearing interposed between the clutch members prevents any appreciable friction between the clutch members while the clutch is open. This roller bearing as distinguished from a ball bearing also permits the clutch members to have longitudinal movement in relation to each other, whereas a ball bearing will not permit this movement. Furthermore, the roller bearing in this relation is desirable because it provides a relatively wide bearing.

Whenever the rod 24 or the lever arm 23 is swung in the opposite direction to that described above the eccentric will allow the arm 17 to be moved to the right and as soon as this occurs the springs 80, which are at all times exerting opposing pressures on the clutch members, will become effective and will move the female clutch member to the right or to the position shown in Figure 5 which immediately disengages the friction surfaces of the clutch members. The motor shaft then runs idle and while it carries the male clutch member with it the female clutch member remains idle. By arranging the cylindrical or hub portions of the clutch members so that one revolves around the other, the clutch as a whole is made compact in the direction of its length, which allows it to be mounted on a relatively short motor shaft.

In motors having the sleeve type of bearing as distinguished from the ball bearing type, for the shaft, it is customary to allow the armature and its shaft to have a slight longitudinal movement for well known reasons. The present clutch does not prevent the slight longitudinal movement of the armature and its shaft because the two arms 16, 17 which apply opposing pressures to the clutch may swing on their pivotal supports 18 so that their lower ends may move slightly in the direction of the axis of the motor shaft and still maintain the opposing pressures on the clutch members to keep them engaged.

The opposing pressures for pressing the clutch members together are not applied in any manner to the shaft so that the means for applying the pressures is entirely independent of the shaft. This is true whether the clutch is applied to a motor shaft, a counter shaft or any other type of shaft, and it is an important factor in the successful operation of the clutch. The opposing forces which force the clutch members together are applied directly to the clutch members. This allows the shaft to have the necessary slight longitudinal end thrust and it also avoids having the pressure applied to the shaft as in many previous constructions.

The opposing pressures are applied axially to the opposite clutch members notwithstanding the slight rocking movements of the arms 16, 17 because of the ball 70 and because of the balls 46. The pulley surrounds the roller bearing and the end of the motor shaft.

Another reason for making the flange 57 adjustable is that when the belt 56 becomes stretched after considerable use, it becomes slightly narrower, and by adjusting the flange 57 the size of the loop of this belt around the pulley may be made the same as before the belt stretched, in order to preserve the same speed ratio between the pulley on the clutch and whatever pulley is driven by the belt 56.

The roller bearing, in addition to permitting the clutch members to revolve freely in relation to each other, also facilitates the sliding of the female clutch member when the pressure of the arms 16, 17 is released, so that the springs 80 have very little to do in releasing the clutch.

Having described my invention, what I claim is:

1. A clutch device including a shaft, co-operative friction clutch members and means for mounting one of said clutch members on said shaft to revolve therewith, and adapted to permit the shaft to have end thrust movement, the other of said clutch members being mounted to revolve in relation to said first clutch member, and means for causing a relative axial shifting of said clutch members to move the clutching portions into and out of operative engagement with each other, said latter means adapted to permit said clutch members to have end thrust movement with said shaft.

2. A clutch device including a shaft, co-operative friction clutch members, means for securing one of said clutch members to said shaft to revolve therewith and adapted to permit said shaft to have end thrust movement, the other of said clutch members mounted to revolve in relation to said first clutch member, a roller bearing mounted between said clutch members, and means for causing a relative axial shifting of said clutch members to move the clutching portions thereof into and out of operative engagement with each other, said latter means adapted to permit said clutch members to have end thrust movement with said shaft.

3. A clutch device including a shaft, co-operative friction clutch members, one of which has a hub portion mounted on said shaft, means for causing said latter clutch member to revolve with the shaft and adapted to permit the shaft to have end thrust movement, the other of said clutch members having a cylindrical portion surrounding the hub portion of said first mentioned clutch member, a roller bearing mounted on the hub portion of said first clutch member, the cylindrical portion of said second clutch member fitting around and revolving on said roller bearing, and means for causing a relative axial shifting of said clutch members to move the clutch portions thereof into and out of operative engagement with each other, said latter means adapted to permit said clutch members to have end thrust movement with said shaft.

4. A clutch device including a shaft, co-operating friction clutch members, one of said clutch members being mounted on said shaft, means for causing said latter clutch member to revolve with the shaft and adapted to permit the shaft to have end thrust movement, the second of said clutch members being revolvable around said first clutch member and movable axially in relation thereto to cause the clutch portions of said clutch members to engage and disengage, members for applying opposing pressures to said clutch members to cause the clutch engaging portions to engage with each other, said latter members adapted to permit said clutch members to follow the end thrust of said shaft while applying opposing pressures to the clutch members.

5. A clutch device including a shaft, co-operating friction clutch members, one of said clutch members being mounted on said shaft, means for causing said latter clutch member to revolve with the shaft and adapted to permit the shaft to have end thrust movement, the second of said clutch members being revolvable around said first clutch member and movable axially in relation thereto to cause the clutch portions of said clutch members to engage and disengage, pivotal members for applying opposing pressures to said clutch members to cause the clutch engaging portions to engage with each other, said pivotal members adapted to permit said clutch members to follow the end thrust of said shaft while applying opposing pressures to the clutch members.

6. A clutch device including a shaft, co-operating clutch members, one of said clutch members being mounted on said shaft, means for causing said latter clutch member to revolve with the shaft, a roller bearing on said clutch member, the other of said clutch members fitting over and revolving around said roller bearing, said clutch members being relatively movable axially to cause the clutch portions of the clutch members to engage and disengage, means for applying opposing pressures to said clutch members to cause clutching engagement between the clutch members, said latter means adapted to permit said clutch members to follow the end thrust of said shaft while applying the opposing pressures to the clutch members.

7. A clutch device including a shaft, co-operating friction clutch members, one of said clutch members being mounted on said shaft, means for causing the latter clutch member to revolve with the shaft, the second of said clutch members being revolvable around said first clutch member, said clutch members being relatively movable axially to permit the clutch portions to be engaged and disengaged, pivotal means for applying opposing pressures to said clutch members to cause the clutch engaging portions thereof to engage each other, and a ball member in line with the axis of said clutch members through which ball member one of said pivotal means applies pressure to one of said clutch members.

8. A clutch device including a shaft, co-operating friction clutch members, one of said clutch members being mounted on said shaft, means for causing the latter clutch member to revolve with the shaft, the second of said clutch members being revolvable around said first clutch member, said clutch members being relatively movable axially to permit the clutch portions to be engaged and disengaged, pivotal means for applying opposing pressures to said clutch members to cause the clutch engaging portions thereof to engage each other, balls disposed on opposite sides of said shaft and through which one of said pivotal means applies pressure to one of said clutch members, and a ball in line with the axis of said clutch members, and through which latter ball the other of said pivotal means applies pressure to the other of said clutch members.

9. A clutch device including a shaft, co-operating clutch members, one of which is mounted on and is revolvable with said shaft, the second clutch member being revolvable in relation to said first clutch member, said clutch members being relatively movable axially to permit the clutch portions to be engaged and disengaged, means for applying opposing pressures to said clutch members to engage the clutch portions thereof, oppositely acting ball thrust bearings interposed between said pressure means and said clutch members, and ball members interposed between said pressure means and said thrust bearings.

10. A clutch device, including a shaft adapted to have end thrust, co-operating clutch members, one of which is mounted on and is revolvable with said shaft, the second clutch member being revolvable in relation to said first clutch member, said clutch members being relatively movable axially, pivotal means for applying opposing pressures to said clutch members to engage the clutch portions thereof, said clutch device being movable with said shaft to permit end thrust of the latter and oppositely acting ball thrust bearings interposed between said pressure means and said clutch members.

11. A clutch device including a shaft, co-operating clutch members, one of which is mounted on and is revolvable with said shaft, the second clutch member being revolvable in relation to said first clutch member, said clutch members being relatively movable axially, means for applying opposing pressures to said clutch members to engage the clutch portions thereof, said means applying opposing pressures to said clutch members without applying axial pressure to said shaft, spring means for moving said clutch members relatively apart to release the clutch portions, and a ball end thrust bearing interposed between said spring means and one of said clutch members.

12. A clutch device including a shaft, co-operating clutch members, one of which is mounted on and is revolvable with said shaft, the second clutch member being revolvable relatively to said first clutch member, said clutch members being relatively movable axially, means for applying opposing pressures to said clutch members to engage the clutch portions thereof, said means applying opposing pressures to said clutch members without applying axial pressure to said shaft, ball end thrust bearings interposed between said pressure means and the clutch members, spring means for moving said clutch members apart, and a ball end thrust bearing interposed between said spring means and one of said clutch members.

13. A clutch device including a shaft, co-operating clutch members, one of which is mounted on and is revolvable with said shaft, a roller bearing on said clutch member, the second clutch member being mounted to revolve on said roller bearing, said clutch members being relatively movable axially, means for applying opposing pressures to said clutch members to cause their clutch portions to engage, and ball end thrust bearings interposed between said pressure means and said clutch means.

14. The combination of a motor having a frame and end caps bolted thereto, and a clutch device for the motor, including the co-operating clutch members associated with the shaft of the motor and relatively movable axially in relation to each other to permit the clutch portions thereof to be engaged and disengaged, and means for supporting the clutch device including members adapted to be bolted onto the ends of the motor frame and to support said clutch device and bolts securing said caps to the motor frame and said supporting members to the motor frame.

15. The combination of a motor and a clutch device therefor, including co-operating clutch members associated with the shaft of the motor and relatively movable axially in relation to each other to permit the clutch portions thereof to be engaged and disengaged, and means for supporting the clutch device, including supporting brackets, bolts for securing said brackets to opposite ends of the motor frame, said brackets being pivotal about said bolts to adjust the support to position the clutch device in relation to the shaft of the motor.

16. The combination of a motor and a clutch device therefor, including co-operating clutch members associated with the shaft of the motor and relatively movable axially in relation to each other to permit the clutch portions thereof to be engaged and disengaged, and means for supporting the clutch device, including brackets secured to the motor frame by bolts and adapted to pivot about said bolts, and a shaft mounted in said brackets and supporting said clutch device.

17. The combination of a motor and a clutch device therefor, including co-operating clutch members associated with the shaft of the motor, and relatively movable axially in relation to each other to permit the clutch portions thereof to be engaged and disengaged, and means for supporting the clutch device, including brackets, bolts for securing said brackets pivotally to said motor frame, a shaft pivotally mounted in said brackets, and arms pivotally mounted on said shaft and adapted to apply opposing pressure to said clutch members to engage the clutch portions thereof.

18. A shaft, a clutch member mounted on and revolvable with said shaft, a second clutch member revolvable in relation to said first clutch member, said clutch members adapted to be moved relatively axially to permit their clutch portions to be engaged, pivotal members for applying opposing pressures to said clutch members to engage the clutch portions thereof, said pivotal members adapted to permit said clutch members to follow end thrust movement of said shaft and eccentric means for moving said pivotal members to apply opposing pressures to said clutch members.

OSCAR I. JUDELSHON.